United States Patent [19]
Harper

[11] Patent Number: 6,086,111
[45] Date of Patent: Jul. 11, 2000

[54] PIPE COUPLING

[75] Inventor: Brian Harper, Hitchin, United Kingdom

[73] Assignee: Glynwed Pipe Systems Limited, Sheldon, United Kingdom

[21] Appl. No.: 09/184,422

[22] Filed: Nov. 2, 1998

[30] Foreign Application Priority Data

Nov. 3, 1997 [GB] United Kingdom .................. 9723238

[51] Int. Cl.$^7$ ....................................................... F16L 9/14
[52] U.S. Cl. ............................ 285/55; 285/322; 285/337; 285/342; 285/369
[58] Field of Search .............................. 285/55, 337, 369, 285/342, 343, 322, 323

[56] References Cited

U.S. PATENT DOCUMENTS

| | | | |
|---|---|---|---|
| 1,921,400 | 8/1933 | Weber | 285/337 |
| 2,268,263 | 12/1941 | Newell et al. | 285/337 |
| 3,782,683 | 1/1974 | Lee et al. | 285/337 |
| 4,648,631 | 3/1987 | Bryant | 285/337 |
| 5,082,313 | 1/1992 | Bryant . | |

FOREIGN PATENT DOCUMENTS

| | | |
|---|---|---|
| 1119055 | 7/1968 | United Kingdom . |
| 2287997 | 10/1995 | United Kingdom . |

*Primary Examiner*—Dave W. Arola
*Attorney, Agent, or Firm*—Kinney & Lange, P.A.

[57] ABSTRACT

The invention provides a pipe coupling (2) for connecting together a first pipe member (P1) having a liner pipe (L1) arranged in the bore thereof, to a second pipe member (P2); the pipe coupling comprising a first sleeve member (8) arranged to receive an end of the first pipe member (P1) whereby an end of the liner pipe (L1) can protrude axially therefrom; a second sleeve member (10) arranged to receive an end of the second pipe member (P2); a first annular sealing means (12) for disposal about the first pipe member (P1), the first annular sealing means (12) being arranged axially between a first annular collar (4) and the first sleeve member (8); second annular sealing means (14) and first gripping means (62) for disposal about an end of the liner pipe (l1), the second annular sealing means (14) being arranged axially between the first and second sleeve members (8,10); third annular sealing means (16) for disposal about the second pipe element (P2), the third annular sealing means (16) being arranged axially between a second annular collar (6) and the second annular sleeve member (10); and means (34,36,38) for drawing the first and second annular collars (4,6) axially together such that the first annular sealing means (12) is compressed axially between the first annular collar (4) and the first sleeve member (8) and is deformed radially inwardly to seal against the first pipe member (P1); the second annular sealing member (14) and first annular gripping means (62) are compressed axially between the first and second sleeve members (8,10) such that the second annular sealing member (14) is deformed radially inwardly into sealing contact with the end of the liner pipe (L1) and the first annular gripping member (62) is urged radially inwardly into gripping contact with the liner pipe (L1); and the third annular sealing member (16) is compressed axially between the second annular collar (6) and the second sleeve member (10) and is deformed radially inwardly into sealing contact with the second pipe member (P2).

20 Claims, 1 Drawing Sheet

PIPE COUPLING

BACKGROUND OF THE INVENTION

This invention relates to a pipe coupling for coupling together a pipe having a liner pipe, hose or sleeve disposed therein to a second pipe member.

Until recently, pipes made from ferrous materials have been used for pipelines, and in particular mains pipelines, for conveying services such as gas and water. A substantial problem with such ferrous pipes has been their tendency to corrode over a period of several years' use leading to loss of integrity of the pipe wall. One solution to this problem has to been to provide a liner pipe, hose or sleeve formed from a suitable material, for example a plastics material such as polyethylene, or an elastomeric material. In order to undertake a pipe lining operation, it is necessary to dig a trench at either end of the ferrous pipe section to be repaired, the liner being pulled through the host pipe bore such that eventually its end protrudes beyond the ferrous pipe end. In order to ensure that the joint is fluid tight, it is then necessary to provide a mechanical seal between the pressure-containing plastics liner and the pipe or fitting to which it is connected, and it is also necessary to provide a mechanical seal between the plastics liner pipe and the host pipe against the ingress of ground water, and a gripping means for preventing retraction of the liner pipe into the host pipe.

It is an object of the present invention to provide such a pipe coupling.

SUMMARY OF THE INVENTION

Accordingly, in a first aspect, the invention provides a pipe coupling for connecting together a first pipe member having a liner pipe arranged in the bore thereof, to a second pipe member; the pipe coupling comprising a first sleeve member arranged to receive an end of the first pipe member whereby an end of the liner pipe can protrude axially therefrom; a second sleeve member arranged to receive an end of the second pipe member; a first annular collar disposed axially outwardly of the first sleeve member and being arranged in use to encircle the first pipe member; a second annular collar disposed axially outwardly of the second sleeve member and arranged in use to encircle an end of the second pipe member; a first annular sealing means for disposal about the first pipe member, the first annular sealing means being arranged axially between the first annular collar and the first sleeve member; second annular sealing means and first gripping means for disposal about an end of the liner pipe, the second annular sealing means being arranged axially between the first and second sleeve members; third annular sealing means for disposal about the second pipe element, the third annular sealing means being arranged axially between the second annular collar and the second annular sleeve member; and means for drawing the first and second annular collars axially together such that the first annular sealing means is compressed axially between the first annular collar and the first sleeve member and is deformed radially inwardly to seal against the first pipe member; the second annular sealing member and first annular gripping means are compressed axially between the first and second sleeve members such that the second annular sealing member is deformed radially inwardly into sealing contact with the end of the liner pipe and the first annular gripping member is urged radially inwardly into gripping contact with the liner pipe; and the third annular sealing member is compressed axially between the second annular collar and the second sleeve member and is deformed radially inwardly into sealing contact with the second pipe member.

The term pipe member as used herein refers to pipes as such, and also to pipe-like members such as elbows, bends, T-pieces, adaptors, valve bodies, and like members. The term liner pipe as used herein includes liner hoses and liner sleeves as well as liner pipes.

The first pipe member is typically a ferrous pipe member, for example a cast iron mains pipe.

The second pipe member can be formed from any pipeline material, but typically is formed from a ferrous material such as ductile iron or steel, or a plastics material such as a polyolefin or a polyvinylhalide material (e.g. polyvinylchloride).

The liner pipe is usually formed from a suitable plastics material such as a polyolefin, e.g. polyethylene. Typically, the liner pipe will have a supporting element, for example a support sleeve, disposed in the end thereof to prevent the liner from collapsing radially inwardly when compressed.

The first and second annular collars are preferably provided with radially extending flanges having an array of aligned holes through which flange bolts can be positioned, tightening of the flange bolts serving to draw the collars axially together.

Alternatively, the annular collar(s) can be threaded to engage complementary threads on the respective sleeve members.

The first and second sleeve members typically have radially outwardly inclined (i.e. flared) end portions at their axial outer ends. In use, the first and third annular sealing members are urged against the respective flared end portions as the annular collars are drawn together, the inclined surfaces of the flared portions assisting the sealing members to be deformed radially inwardly against the respective pipe members.

The axially inner ends of the first and second sleeve members can be configured so that together they define an annular cavity within which is disposed the second sealing member and the first annular gripping member. One of the sleeve members can have an axially inner end (hereinafter referred to as the spigot portion) which is radially outwardly inclined (i.e. flared) and is of a size enabling it to be received within a socket portion of the axially inner end of the other sleeve member. The socket portion can comprise a generally cylindrical or slightly inclined region extending in a direction towards the axially outer end of the sleeve member into a radially inwardly inclined (i.e. tapering) abutment surface. The inner surface of the spigot portion, and the generally cylindrical or slightly inclined region and tapering abutment surface of the socket portion together can define the annular cavity.

The annular cavity can contain only an annular sealing means, but preferably the cavity also contains the first annular gripping means for gripping the liner pipe. The first annular gripping means can be formed integrally with the sealing means or it can be a separate element. For example, the gripping means can take the form of gripping elements embedded in the sealing means.

In a further aspect, the invention provides a pipe joint comprising first and second pipe members and a liner pipe disposed within the first pipe member; the first and second pipe members and liner member being coupled together by means of a pipe coupling as hereinbefore defined.

DESCRIPTION OF THE PREFERRED EMBODIMENT

Figure 1:
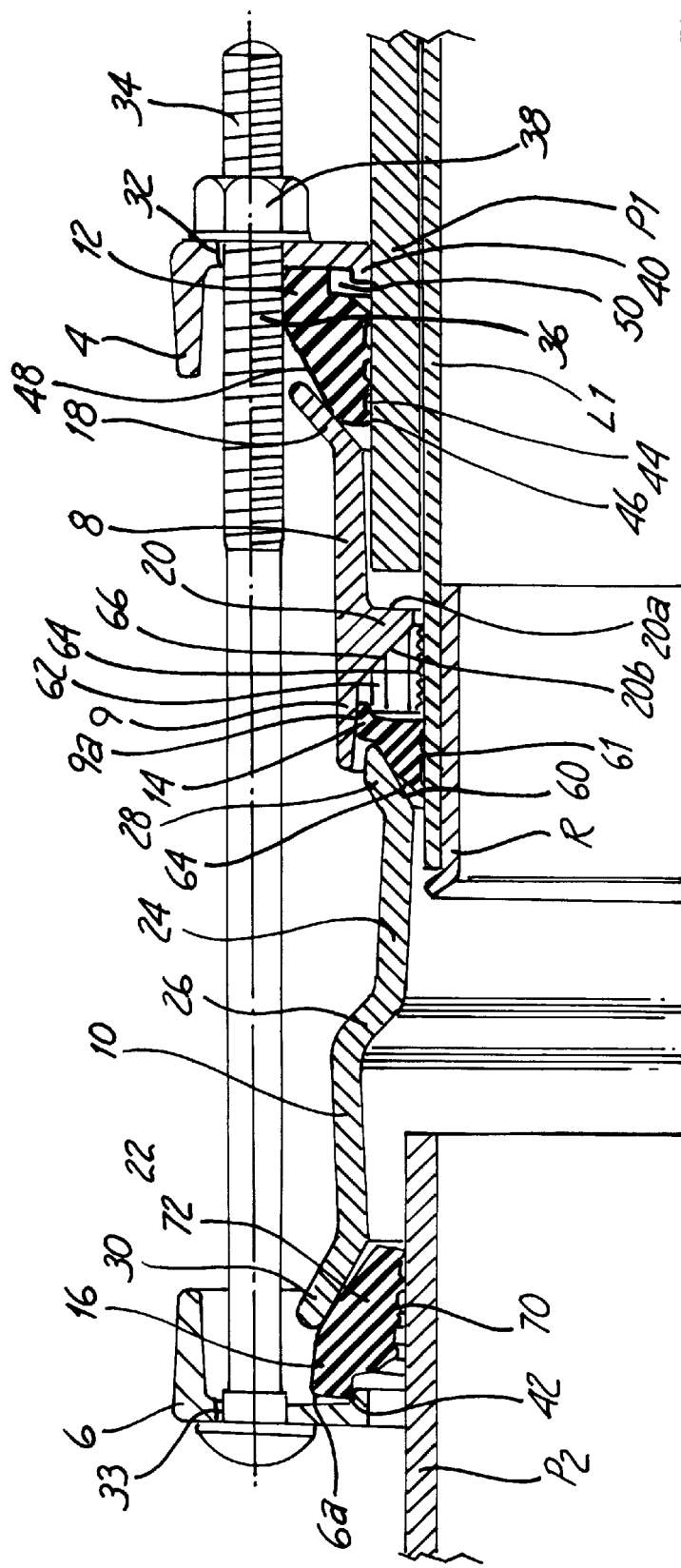
FIG. 1 which is a partial sectional elevation through a pipe coupling according to one embodiment of the invention.

Referring now to FIG. 1, the coupling 2 comprises first and second annular collars 4, 6, first and second sleeve members 8, 10, and first, second and third annular sealing members 12, 14, 16.

First sleeve member 8 is generally cylindrical in form and is typically fabricated from ductile or malleable iron, or mild steel. Sleeve member 8 has a flared axial end portion 18 and a radially inwardly oriented abutment portion 20. Abutment portion 20 has an axially outer surface 20a which is generally perpendicular to the axis of the coupling. The axially inner surface 20b of the abutment portion is inclined and forms a tapering abutment surface.

The second sleeve member 10 has an enlarged bore portion 22 and a reduced bore portion 24, the enlarged and reduced bore portions 22, 24 being linked by a radially inclined portion 26. Both the reduced bore portion and the enlarged bore portion extend into radially outwardly flared portions 28, 30 respectively.

At either end of the coupling are annular collars 4 and 6. In this embodiment, the annular collars are substantially identical in form, each having an array of aligned holes 32, 33 through which a flange bolt 34 is inserted. A nut 38 engages the threaded region 36 of the flange bolt enabling the two annular collars to be tightened together.

Each of the annular collars 4, 6 have annular lip portions 40, 42 at their radially inner edges.

Disposed axially between the first annular collar 4 and the first sleeve member 8 is the first annular sealing member 12. Annular sealing member 12 has a generally cylindrical radially inner surface 44 configured to provide a plurality of annular gripping ribs 46. The sealing member 12 has a radially outwardly inclined surface 48 and an annular recess region 50. In use, the axially inner end of inclined surface 48 abuts against the flared portion 18 of the sealing member 8.

The annular collar 4, sealing member 12 and sleeve member 8 are shaped so as to be able to receive therein an end of a mains pipe P1, which may be for example a cast iron mains pipe. Mains pipe P1 has extending from the end thereof a link of liner pipe L1 which is formed from a suitable grade of polyethylene. Disposed within the protruding end of the liner pipe L1 is a short length of a reinforcing liner R which may, for example, be formed from a plastics material such as polyethylene or a metal such as aluminium.

The sleeve member 8 has, at its axially inner end, a socket portion 9 defined by a generally cylindrical but slightly tapering region 9a and the tapering abutment surface 20b. The generally cylindrical region 9a and the abutment surface 20b, together with the inner surface of the flared end 28 of the second sleeve member 10, form an annular cavity 60 within which are disposed the second annular sealing member 14 and a gripping member 62. Second annular sealing member 14 has a generally cylindrical radially inner surface provided with an array of annular ribs 61, and has a radially inclined surface 64 at its axially inner end. The radially inclined surface 64 rests against the radially inner surface of the flared portion 28 of the second sleeve member 10. Gripping member 62 typically is formed from a plastics material, e.g. an engineering plastics material such as Nylon or polyacetal, although it could be made instead from a metal such as steel, and has an array of annular gripping ribs or serrations 64 on its radially inner surface. Gripping ring 62 also has a radially inclined surface 66 which abuts against inclined surface 20b of the abutment portion 20 of the first sleeve member 8.

Disposed between the second sleeve member 10 and the second annular collar 6 is the third annular sealing member 16. As with the first and second annular sealing members, the third annular sealing member has an array of ribs 70 on its radially inner surface, and has a radially inclined surface 72 which abuts against the radially inner surface of the flared end portion 30 of the second sleeve member.

The second annular collar 6, the third sealing member 16 and the enlarged bore portion 22 of the second sleeve member are configured to receive therein an end of a second pipe member P2 which may be, for example, a short length of polyethylene or metal pipe.

In use, the first and second pipe members P1 and P2 are inserted into the respective ends of the coupling, such that the liner pipe L1 protrudes from the end of the mains pipe P1, and the two annular collars 14 and 16 are drawn axially together by tightening the flange bolt/nut arrangements 34, 36, 38 as the two annular collars 14, 16 are drawn together, each of the annular sealing members are compressed and deformed radially inwardly into contact with their respective pipe members or liner pipe.

Thus, first annular sealing member 12 is compressed axially between the flared end portion 18 of the first sleeve member 8 and an axially inner face 4a of the first annular collar 4. As the inclined surface 48 of the sealing member 12 is urged into engagement with the radially inner surface of flared portion 18, the effect is to compress the sealing member 12 radially inwardly against the mains pipe P1, thereby to form a seal between the mains pipe P1 and the sleeve member 8. The resulting seal prevents, for example, entry of ground water into any annular space between the pipe P1 and the liner pipe L1.

As the annular collars 4 and 6 are drawn together, the second sealing member 14 and the gripping member 62 are compressed between the first and second sealing members and are urged radially inwardly into sealing and gripping contact with the liner pipe L1. The gripping ribs or serrations 66 of the gripping member bite into the outer surface of the liner to prevent it from being dislodged, whilst the sealing member provides a seal between the first sleeve member 8 and the liner pipe L1 and also between the second sleeve member 10 and the liner pipe L1. The support sleeve R disposed within the end of the liner prevents the liner from collapsing as it is subjected to compressive forces.

A seal is formed in similar fashion between the second pipe member P2 and the sleeve member 10 by means of compression of the third annular sealing member 16. In this case, the third sealing member is compressed between an inner axially inner face 6a of the annular collar and the radially inner surface of the flared portion 30 of the second sleeve member 10.

The arrangement shown in FIG. 1 has certain advantageous properties. Thus for example, it is easy to install and can be used to connect together pipes formed from a variety of different types of material and having different diameters. In particular, it can be used on essentially any type of pipe material P2 and can accommodate different lengths of pipe P2 to suit different trench conditions.

The invention has been illustrated by reference to a single embodiment as shown in FIG. 1, but it will readily be appreciated that numerous modifications and alterations could be made to the embodiment shown in FIG. 1 without departing from the principles underlying the invention. All such modifications and alterations are intended to be embraced by this application.

I claim:

1. A pipe coupling for connecting together a first pipe member having a liner pipe arranged in the bore thereof, to a second pipe member; the pipe coupling comprising a first sleeve member arranged to receive an end of the first pipe member whereby an end of the liner pipe protudes axially therefrom; a second sleeve member arranged to receive an end of the second pipe member; a first annular collar disposed axially outwardly of the first sleeve member and being arranged in use to encircle the first pipe member; a second annular collar disposed axially outwardly of the second sleeve member and arranged in use to encircle an end of the second pipe member; a first annular sealing means for disposal about the first pipe member, the first annular sealing means being arranged axially between the first annular collar and the first sleeve member; second annular sealing means and first gripping means for disposal about an end of the liner pipe, the second annular sealing means being arranged axially between the first and second sleeve members; third annular sealing means for disposal about the second pipe element, the third annular sealing means being arranged axially between the second annular collar and the second annular sleeve member; and means for drawing the first and second annular collars axially together such that the first annular sealing means is compressed axially between the first annular collar and the first sleeve member and is deformed radially inwardly to seal against the first pipe member; the second annular sealing member and first annular gripping means are compressed axially between the first and second sleeve members such that the second annular sealing member is deformed radially inwardly into sealing contact with the end of the liner pipe and the first annular gripping member is urged radially inwardly into gripping contact with the liner pipe; and the third annular sealing member is compressed axially between the second annular collar and the second sleeve member and is deformed radially inwardly into sealing contact with the second pipe member.

2. A pipe coupling according to claim 1 wherein said means for drawing includes the first and second annular collars provided with radially extending flanges having an array of aligned holes through which flange bolts can be positioned, tightening of the flange bolts serving to draw the collars axially together.

3. A pipe coupling according to claim 1 wherein the first and second sleeve members have radially outwardly inclined end portions at their axial outer ends.

4. A pipe coupling according to claim 1 wherein the axially inner ends of the first and second sleeve members are configured so that together they define an annular cavity within which is disposed the second sealing member and the first annular gripping member.

5. A pipe coupling according to claim 4 wherein the annular cavity contains only the second annular sealing means.

6. A pipe coupling according to claim 4 wherein the annular cavity contains the second annular sealing means and the first annular gripping means for gripping the liner pipe.

7. A pipe coupling according to claim 4 wherein one of the sleeve members has an axially inner end forming a spigot portion which is radially outwardly inclined and is of a size enabling it to be received within a socket portion of the axially inner end of the other sleeve member.

8. A pipe coupling according to claim 7 wherein the socket portion comprises a generally cylindrical or slightly inclined region extending in a direction towards the axially outer end of the sleeve member into a radially inwardly inclined abutment surface.

9. A pipe coupling according to claim 8 wherein the inner surface of the spigot portion, and the generally cylindrical or slightly inclined region and tapering abutment surface of the socket portion together define the annular cavity.

10. A pipe coupling according to claim 1 wherein the first annular gripping means and the second annular sealing means are defined by a single member.

11. A pipe coupling according to claim 1 wherein the first annular gripping means and the second annular sealing means are defined by separate members.

12. A pipe coupling according to claim 1 wherein the first annular gripping means and the second annular sealing means are formed integrally.

13. A pipe coupling according to claim 12 wherein the first annular gripping means takes the form of gripping elements embedded in the second annular sealing means.

14. A pipe joint comprising a first pipe member having a liner pipe arranged in the bore thereof, a second pipe member; and a pipe coupling; the pipe coupling comprising a first sleeve member having received therein an end of the first pipe member whereby an end of the liner pipe protrudes axially therefrom; a second sleeve member having received therein an end of the second pipe member; a first annular collar disposed axially outwardly of the first sleeve member and encircling the first pipe member; a second annular collar disposed axially outwardly of the second sleeve member and encircling an end of the second pipe member; a first annular sealing means disposed about the first pipe member, the first annular sealing means being arranged axially between the first annular collar and the first sleeve member; second annular sealing means and first gripping means disposed about an end of the liner pipe, the second annular sealing means being arranged axially between the first and second sleeve members; third annular sealing means disposed about the second pipe element, the third annular sealing means being arranged axially between the second annular collar and the second annular sleeve member; and means for drawing the first and second annular collars axially together such that the first annular sealing means is compressed axially between the first annular collar and the first sleeve member and is deformed radially inwardly to seal against the first pipe member; the second annular sealing member and first annular gripping means are compressed axially between the first and second sleeve members such that the second annular sealing member is deformed radially inwardly into sealing contact with the end of the liner pipe and the first annular gripping member is urged radially inwardly into gripping contact with the liner pipe; and the third annular sealing member is compressed axially between the second annular collar and the second sleeve member and is deformed radially inwardly into sealing contact with the second pipe member.

15. A pipe joint according to claim 14 wherein said means for drawing includes the first and second annular collars provided with radially extending flanges having an array of aligned holes through which flange bolts can be positioned, tightening of the flange bolts serving to draw the collars axially together.

16. A pipe joint according to claim 14 wherein the first and second sleeve members have radially outwardly inclined end portions at their axial outer ends.

17. A pipe joint according to claim 14 wherein the axially inner ends of the first and second sleeve members are configured so that together they define an annular cavity within which is disposed the second sealing member and the first annular gripping member.

18. A pipe joint according to claim 17 wherein one of the sleeve members has an axially inner end which is radially outwardly inclined and is of a size enabling it to be received within a socket portion of the axially inner end of the other sleeve member.

19. A pipe joint according to claim 17 wherein the annular cavity contains the second annular sealing means and the first annular gripping means for gripping the liner pipe.

20. A pipe coupling according to claim 14 wherein the first annular gripping means and the second annular sealing means are defined by separate members.

* * * * *